R. S. TROTT.
DETACHABLE COUNTERBALANCE FOR MOTOR CRANK SHAFTS.
APPLICATION FILED MAY 2, 1919.

1,350,269.

Patented Aug. 17, 1920.
2 SHEETS—SHEET 1.

WITNESS:

INVENTOR.
Rolland S. Trott

R. S. TROTT.
DETACHABLE COUNTERBALANCE FOR MOTOR CRANK SHAFTS.
APPLICATION FILED MAY 2, 1919.

1,350,269.

Patented Aug. 17, 1920.
2 SHEETS—SHEET 2.

WITNESS:
Joseph D Pender
Chas. E. Hatch

INVENTOR.
Rolland S. Trott

UNITED STATES PATENT OFFICE.

ROLLAND S. TROTT, OF DENVER, COLORADO.

DETACHABLE COUNTERBALANCE FOR MOTOR CRANK-SHAFTS.

1,350,269.         Specification of Letters Patent.         Patented Aug. 17, 1920.

Application filed May 2, 1919. Serial No. 294,236.

*To all whom it may concern:*

Be it known that I, ROLLAND S. TROTT, a citizen of the United States, residing at Denver, county of Denver, and State of Colorado, have invented certain new and useful Improvements in Detachable Counterbalances for Motor Crank-Shafts, of which the following is a specification.

The object of my invention is to provide a detachable counterbalance so designed that accommodation may be made for crankshafts in which in commercial production the bearings have been finished off-center from the center of the oblique arm of the crankshaft forging; that is, the counterbalances may be trued up to revolve with the finished crankshaft bearings as a center even though they are clamped upon the unfinished part of the forging which is off-center from the finished bearings.

A further object is to provide a detachable counterbalance in which the clamping bolts are held from turning so that but one wrench is required in clamping the counterbalances in place.

A further object is to provide a detachable counterbalance which may be so designed that it can easily be fitted to the oblique arms of crankshafts of motors of one certain make, for instance, and adjusted centrally with the finished bearings regardless of the slight variations that are bound to happen in any one make when new forging dies are made for even the same design of shaft; and likewise adjusted centrally with the finished bearings regardless of the slight irregularities that occur in different crankshafts made from the same identical dies.

A further object is to provide a detachable counterbalance so designed that it may be clamped upon the oblique arms of a motor crankshaft in such a manner that the clamping bolts have to withstand little, if any, of the centrifugal forces set up when the motor runs.

Most motor crankshafts are statically in balance; that is, looking at the end of the shaft the off-center weights of the cranks and arms are symmetrically distributed about the central axis. A crankshaft in static balance may be put on level parallel knife edges and the shaft will not tend to revolve, but will be balanced in any position, due to the equal distribution of the off-center weights about its center of rotation, when viewed endwise.

But these off-center weights of arms and cranks are not directly opposed to each other, but are placed at different positions along the shaft, so that commonly, none of the off-center weights have equal weights directly opposite them.

However, if the crankshaft is thick and stiff, and the crankcase and its bearings are of rigid construction, the effect of this lack of direct opposition of off-center weights is minimized.

But, in the case of a light, thin crankshaft, each off-center not directly opposed weight sets up centrifugal forces of its own, which the light crankshaft is not stiff enough to neutralize by combining with the other centrifugal forces, and so there is enough springing in the crankshaft to allow each separate centrifugal force set up, to act separately on the nearest bearing with the consequent engine vibration and its resulting wear on the bearings, and general deterioration.

In the drawings, Figure 1 is a standard type of crankshaft which when properly finished is balanced statically, but not when revolving, that is, not dynamically.

Figure 1:
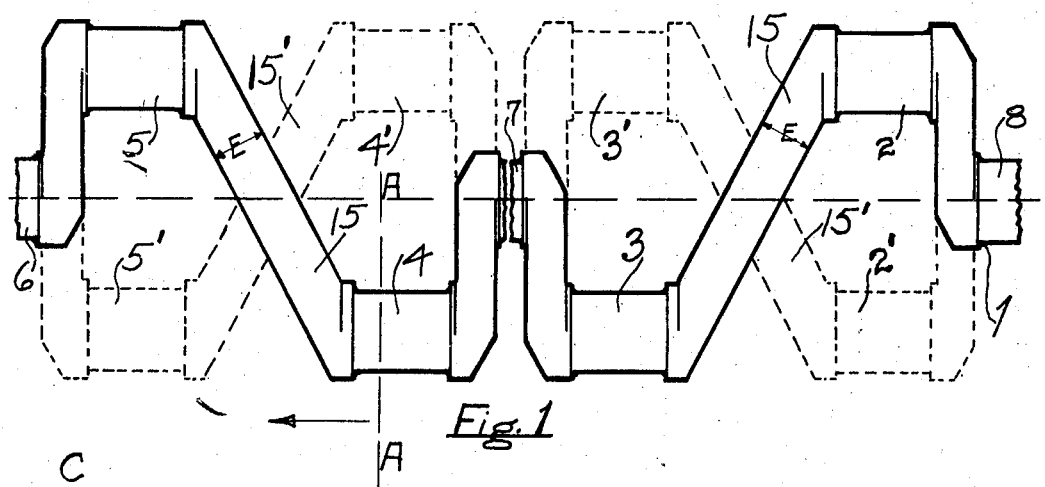

In Fig. 1 it will be seen that the crankshaft I has crank bearings or pins 2, 3, 4, 5 and main bearings 6, 7 and 8. When stationary, cranks 2 and 3 are balanced against each other, as are cranks 4 and 5.

For the crankshaft to be perfectly balanced dynamically, however, each off-center crank and arm should have an equal and opposite crank and arm, such as shown dotted at 2', 3', 4' and 5'. That is, each off-center weight should have an equal weight directly opposite, which would give to the crankshaft a running or dynamic balance as true as that of a straight cylindrical shaft.

This is, of course, for theoretically perfect balance, which can never quite be attained practically.

For, practically, the crankshaft can not be considered alone, but must be taken as it is when mounted in the running engine; that is, with a connecting rod on each crank pin, part of the weight of which must be considered in counterbalancing.

Also, the connecting rods on the crank pins make it impossible to balance the shaft dynamically by off-center weights that are exactly opposite the crank pins; but the closest approximation possible to such a condition gives very satisfactory results.

That is, in practice, the counterbalance weight may be placed as nearly directly opposite the crank pins as practical commercial running clearance with the connecting rods permits and the results will be quite close to the theoretical.

Figure 3:
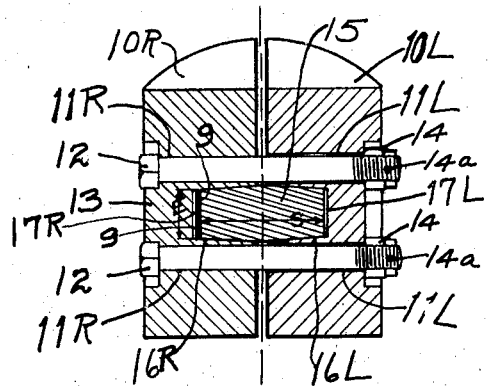
Fig. 3 shows a section of one counterbalance and the arm upon which it is clamped.
Figure 4:
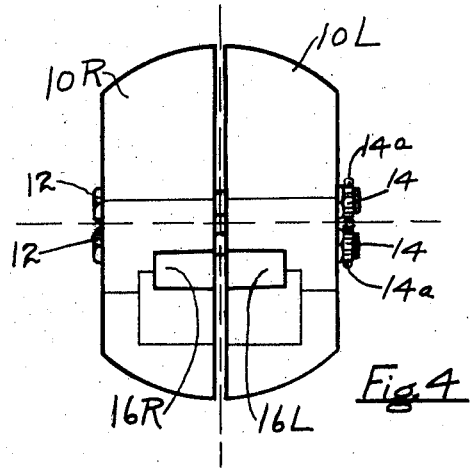
Fig. 4 shows an end view of the two halves of a counterbalance.

It is common practice in the design of crankshafts to make the oblique arms joining the various bearings of oblong cross section. It will be seen in Fig. 3 that the greater dimension, S, is in a direction at right angles to the plane of the two bearings which the arm connects, so that the arm may the better withstand the strain to which it is subjected.

In some excellent commercial crankshafts, the side, S, of the arm is as much as four times as great as the edge, E. It will be seen that my counterbalances clamp upon the edges of the arms, and not upon the sides of the arms, and the reason for this will appear below.

Figure 5:
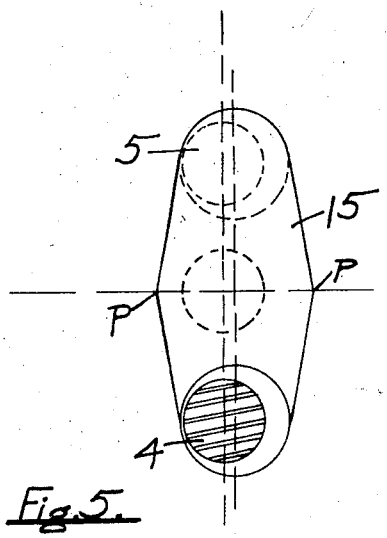
Fig. 5 shows a section on the line A—A of Fig. 1, of a crankshaft in which the center of the forging does not coincide with the center of the finished bearings.
Figure 6:
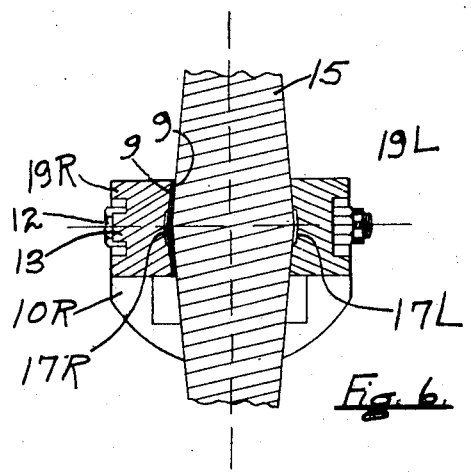
Fig. 6 shows a section of a counterbalance and the oblique arm upon which it is clamped along the length of the arm.

In Fig. 5 will be seen an example of a crankshaft in which the cranks and main bearings have been machined off-center from the center of the oblique arm of the crankshaft forging.

In commercial production, especially on the cheaper cars, this seems to be the rule rather than the exception. It is, of course, impossible, within the limits of commercial cost requirements to make all forgings absolutely perfect. So the machinist does the best he can to minimize the imperfections while setting the forging so the bearings will all clean up, and still make time on the job.

The result is that most crankshafts on the cheaper grade of automobiles have a certain off-center distance between the centers of the rough arms, and of the finished bearings, which varies in amount in different shafts and is in some to the right, and in some to the left.

If detachable counterbalances are clamped upon these unfinished, off-center arms, the result will, of course, be very far from what is desired.

In my present invention, the detachable counterbalances are clamped upon the edges of the arms, as may be seen in Fig. 5, so that the off-center distance may be rectified by means of the shims 9, 9, made of metal or any other proper material. By careful selection of the shims to be used, my counterbalances can be trued up so they will be absolutely central with the main bearings, which heretofore has been impossible with detachable counterbalances on crankshafts whose unfinished arms are off-center from the finished bearings.

Figure 2:
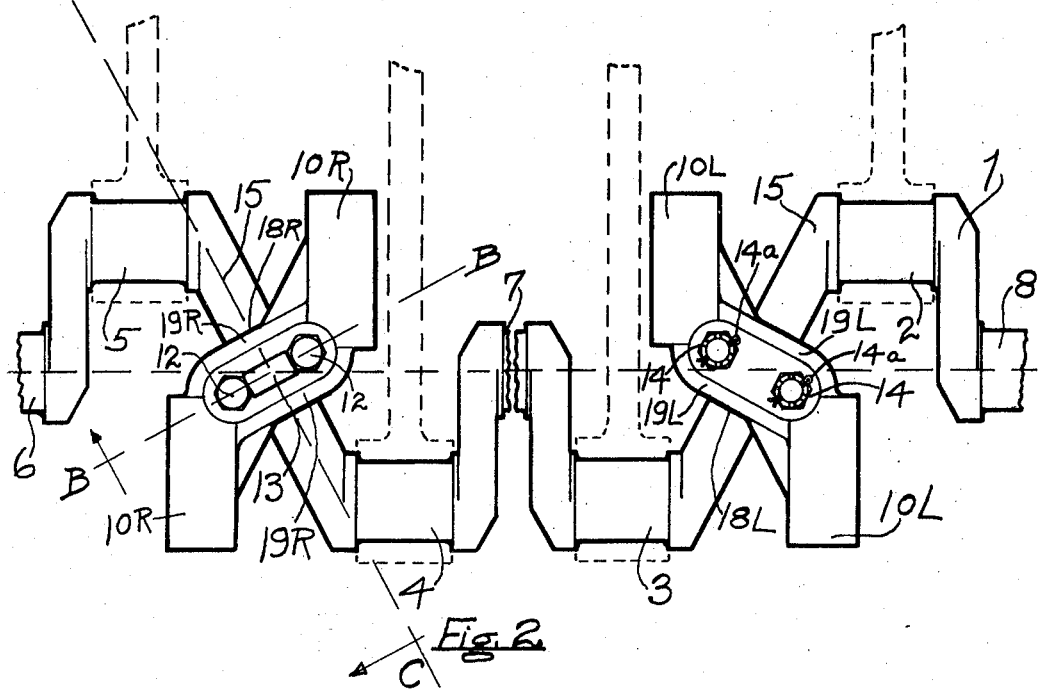
Fig. 2 shows the same crankshaft with my counterbalances clamped upon it.

In Fig. 2 it will be seen that for a four cylinder crankshaft two of my counterbalances, 10, 10, are required, and that each counterbalance consists of a right half 10 R and a left half 10 L. The right half 10 R is provided with holes 11 R into which the clamping bolts 12, 12, fit closely. The block 13, is a part of the right half 10 R and it prevents the bolts 12, 12, from turning, so that no wrench is needed to hold said bolts when tightening up the castellated nuts 14, 14.

The left half 10 L, is provided with holes 11 L, 11 L, through which the bolts 12, 12 fit freely, so that the two halves will be able to properly adjust themselves to the oblique arm 15, of the crankshaft I. Cotter pins 14$^a$ are used to lock the castellated nuts 14 in place.

The right half 10 R is provided with a slot or groove 16 R and the left half 10 L with a groove 16 L, to fit the edge, E, of the oblique arm 15, of the crankshaft.

It is common practice in the design of the long oblique arm of crankshafts to have it widest at the center, tapering toward each end, as will be seen in Fig. 5. So the cross section of the arm 15, is greatest at the central point, P, due to the increase of the dimension of the side, S, toward the center of the arm. However, in commercial production, it is found that irregularities are bound to creep in, and this point, P, is seldom if ever actually in the center of the oblique arm of the forging.

For this reason I provide depressions 17 R and 17 L in the bottom of the slots or grooves 16 R and 16 L, extending a short distance either side of the center of the said slots or grooves. This allows the counterbalances to be moved along the oblique arm 15, till they are properly centered regardless of the variation in the exact position of the high point, P, of the arm 15.

Thus it will be seen that in the plane of the cranks my counterbalances may be properly centered by movement along the oblique arms of the shaft; and in the plane at right angles to the plane of the cranks, my counterbalances may be perfectly centered by the proper use of shims, regardless of any discrepancy between the center of the bearings and the center of the unfinished arms of the shaft.

In Fig. 2, it will be seen that each half of my counterbalance is composed of two weights disposed on opposite sides of the shaft axis, and thus balanced against each other.

This overcomes one of the greatest drawbacks to clamped-on counterbalances for crankshafts, as it very greatly reduces the amount of centrifugal force which the clamping bolts must withstand, and makes my counterbalances no more in danger than a connecting rod of being thrown off the shaft.

It will be seen that the opposed weights of both the right half 10 R and the left half 10 L are joined by arms 18 R and 18 L, which roughly take the place of the arm 15' in the theoretically perfect balancing construction shown in Fig. 1.

The ribs 19 R and 19 L give strength to these arms without greatly increasing the off-center weight whose centrifugal force brings a direct strain upon the clamping bolts 12, 12.

Also, in my counterbalances the opposed weights of each half, roughly take the place of the weights of the crank pins and short arms of the theoretically perfect balancing construction shown in Fig. 1.

Thus my detachable counterbalances provide means to balance a crankshaft as close as is practically possible to the theoretically perfect construction.

It will now be seen that my improved detachable counterbalances by clamping upon the edges of the oblique crankshaft arms permit of a central mounting regardless of any lack of coincidence of the center of the rough forging with that of the finished bearing; that the block 13 by bearing against the faces of the heads of the clamping bolts holds them from turning so that but one wrench is required in installing the counterbalances; that because of the central depressions in the slots or grooves 17 R and 17 L the counterbalances may be moved along the oblique arm to the proper position regardless of variation in the position of the wide point of said arm; and lastly, that because each half of each counterbalance is balanced in itself, the clamping bolts are relieved of much of the strain of the centrifugal force they otherwise would have to withstand.

Having now described my invention, what I claim as new, and desire to protect by Letters Patent, is as follows:—

1. A crankshaft counterbalance comprising two members each composed of a pair of joined, opposed weights for application to the opposite edges of the arm of a crankshaft and means extending transversely of the crankshaft for clamping said two members together against the edges of said crankshaft.

2. A crankshaft counterbalance including two members having weighted outer ends and an obliquely disposed center connecting the weighted ends, the inner faces of the oblique centers recessed diagonally to receive and embrace the oblique arm of the crank-shaft from opposite sides, with the weighted ends of each member disposed on opposite sides of the arm, and means extending astride the arm for securing the counterbalance thereon.

3. A crankshaft counterbalance including counterpart members having oblique centers and weighted outer ends, the centers diagonally recessed to receive and embrace an oblique arm of the crankshaft from opposite sides, the weighted ends of each member disposed on opposite sides of the arm and in different transverse planes and the corresponding ends of each member in the same transverse plank.

4. A crankshaft counterbalance including two members having weighted outer ends and an obliquely disposed center connecting the weighted ends, the inner faces of the oblique centers recessed diagonally to receive and embrace the oblique arm of the crank-shaft from opposite sides, both the weighted ends of each member disposed on opposite sides of the arm, bolts extending transversely of the centers of the two members for securing the counterbalances thereon, cavities in one of the centers for receiving the bolt heads and a web arranged in the cavities for preventing the bolts from turning.

5. A crank-shaft counterbalance including two members attached to an arm of the crankshaft where the arm crosses the axial center of the latter, said members embracing the arm from opposite sides in such a manner that the arm itself directly resists any tendency of the members to move away from the arm due to centrifugal action, and means extending transversely of the arm for holding the members together.

6. A counterbalance for crankshafts composed of two members, each having a weight at each end and fashioned at an intermediate point to receive and fit opposite edges of an arm of the crankshaft, said members clamped together upon said arm of the crankshaft and located wholly on opposite sides of a plane drawn through the arm and the wrist pins which it connects.

7. A counterbalance for crank shafts composed of two members each having weighted outer ends made to clamp upon an arm of the crank shaft, said members located on opposite sides of the plane passing through the arm and the axis of its two adjacent wrist pins.

8. The combination with a crank shaft having two arms, and a counterbalance supported by the latter, said counterbalance composed of two members adapted to cross the point of support, each of which members has a weight at its opposite ends.

9. A crank-shaft counterbalance including two members having weighted outer ends and an obliquely-disposed center connecting the weighted ends, the inner faces of the oblique centers recessed diagonally to receive and embrace the oblique arm of the crank-shaft from opposite sides, with the weighted ends of each member disposed on opposite sides of the arm, bolts extending transversely of the centers of the two members for securing the counterbalance thereon, and common means for preventing the bolts from turning.

ROLLAND S. TROTT.